Jan. 27, 1970     C. OFFIE     3,492,444

COMPACT TIME DELAY MOVEMENT RESPONSIVE CONTROL ASSEMBLY

Filed Jan. 10, 1967     3 Sheets-Sheet 1

INVENTOR
CARMEL OFFIE

BY *Robillard and Beyrne*
ATTORNEYS

Jan. 27, 1970  C. OFFIE  3,492,444
COMPACT TIME DELAY MOVEMENT RESPONSIVE CONTROL ASSEMBLY
Filed Jan. 10, 1967  3 Sheets-Sheet 2

INVENTOR
CARMEL OFFIE

BY Robillard and Byrne
ATTORNEYS

INVENTOR
CARMEL OFFIE

United States Patent Office 3,492,444
Patented Jan. 27, 1970

3,492,444
COMPACT TIME DELAY MOVEMENT RESPONSIVE CONTROL ASSEMBLY
Carmel Offie, Washington, D.C., assignor to Global Enterprises, Incorporated, a corporation of New York
Filed Jan. 10, 1967, Ser. No. 608,416
Int. Cl. H01h 35/02
U.S. Cl. 307—119
16 Claims

ABSTRACT OF THE DISCLOSURE

A compact time delay movement responsive electrical control assembly, including a circuit having a time delay switch operated by a piston in response to a gas pressure and a pendulous operated switch normally held in one plane and closed upon movement out of the plane; a second circuit including the time delay switch; a rotary selector for selectively closing a master switch in one circuit, a master switch in the other circuit, or both simultaneously; a power source, and means in each circuit actuated by completion of the circuit.

---

The invention herein relates to a compact time delay, movement responsive electrical control assembly, having circuits including a time delay switching means, at least one circuit also having a movement responsive switching means, and selector means rendering one circuit or more than one circuit operative.

A primary object of the invention is a compact assembly of the above-indicated type which may be utilized for actuating means after a predetermined period of time or delay, upon movement after a predetermined period of time, upon any movement, or upon a combination of the foregoing.

A still further object of the invention is an assembly of the above type which may be utilized with armaments, and when so utilized includes means for safe handling, and means for making the device tamper proof.

A still further object is an assembly of the above-indicated type which is extremely small. For example, an assembly actually reduced to practice, and including the safety and tamper proof means, and which is shown and described herein has a diameter of four inches and a height of three inches. It may readily be carried in one hand, and is sufficiently light to be thrown a fair distance. Substantially all the included parts were obtained on the open market. It will become apparent that further miniaturization could be readily accomplished.

The foregoing objects and advantages will be fully understood from the following description when read in light of the accompanying drawings wherein.

Figure 1:
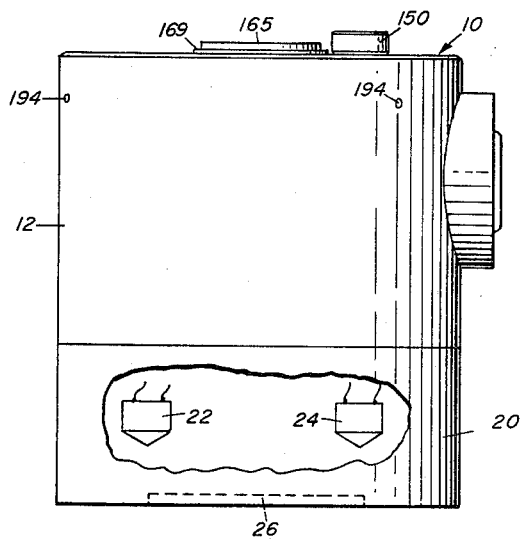
FIGURE 1 is a view of the assembly, including an attached explosive charge, the explosive charge being omitted in the remaining figures.
Figure 6:
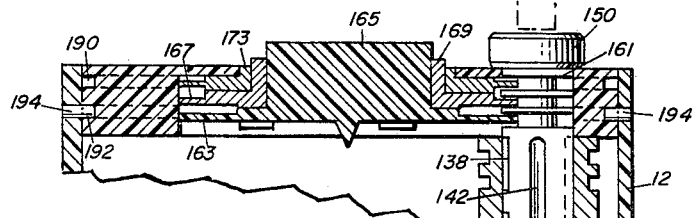
FIGURE 6 is a detail view of the closure, selector and interlocking means.

Referring to the drawings, the assembly 10 includes a receptacle 11 having a cylindrical side wall 12, a flat bottom 14 (FIGURE 5) and a removable top closure 16 (FIGURE 6). In FIGURE 1, there is shown a lower receptacle 20 secured to the bottom of receptacle 11, and in which there is an explosive charge, and there is thus provided a land mine. A pair of primers 22 and 24 are located in the explosive charge, and thus in this instance the means to be actuated are the primers which are exterior of the assembly. The lower receptacle 20 may be provided with a magnetic insert 26 for attaching the mine to a ferrous target, such as a tank.

Figure 7:
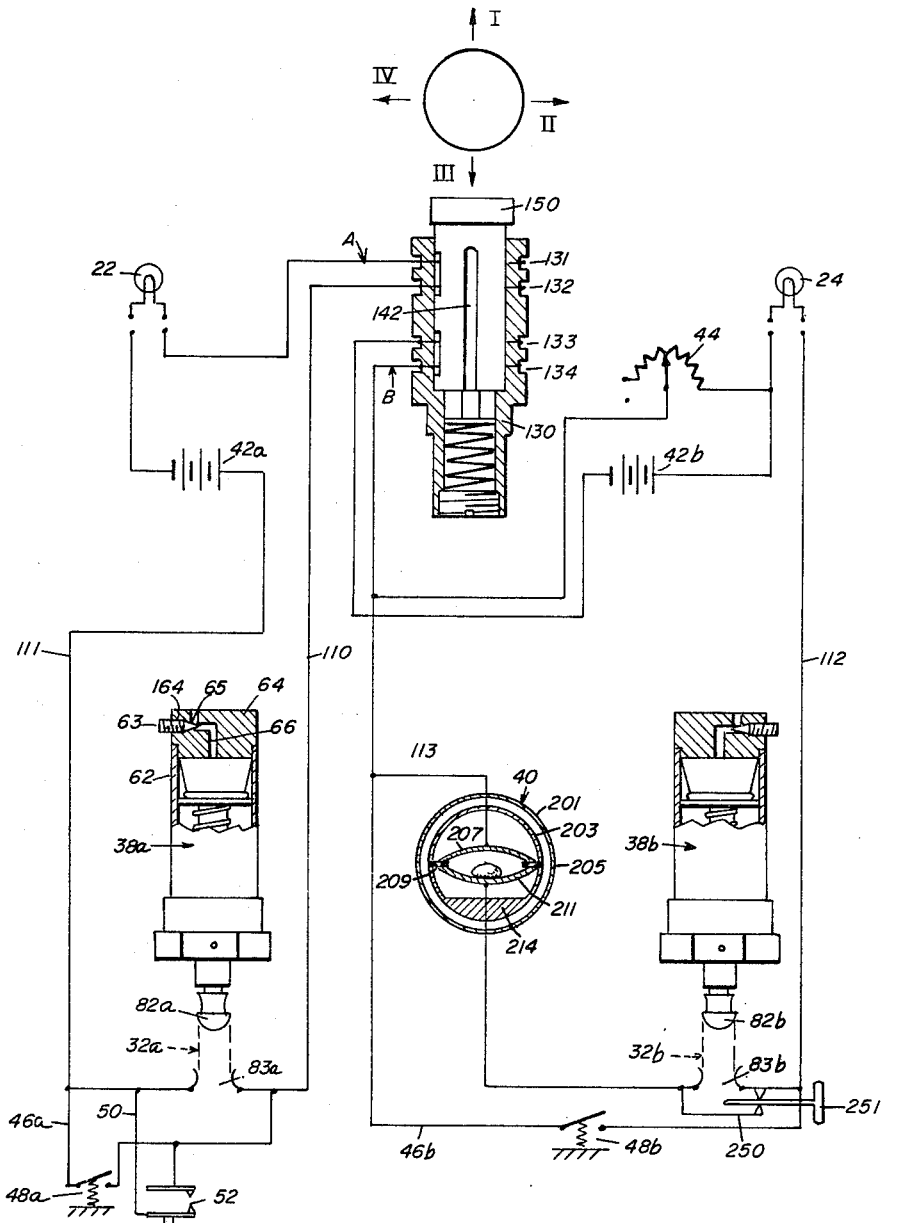
FIGURE 7 is a schematic view of the electrical system and associated control devices.

Before describing the specific construction of the assembly 10, reference is made to FIGURE 7 which illustrates the control system including series circuits A and B, selector means 30, timer controls 38, and a movement control 40. More particularly, the primer 22, herein illustrated as a flash bulb, is in and actuated upon completion of circuit A, and the second primer 24 is in and actuated upon completion of the circuit B. The circuits A and B are normally open, and the selector means 30 may be selectively set to close a master switch in the circuit A, alternately a master switch in the circuit B, or to simultaneously close the master switches in both circuits.

Each of the circuits include a second, normally open switch 32, and as both circuits include like parts, the similar parts will be given like numbers and suffixes $a$ and $b$ added, as necessary, to designate the circuit location. The switches 32$a$ and $b$ are operated by an associated gas pressure responsive time delay device 38$a$ and $b$. Circuit B includes a movement control device, namely, the pendulous mercury switch 40, which normally remains in one plane, in which position it is open, and becomes closed upon movement out of the plane. Each circuit further includes a battery power source 42$a$ and $b$.

With this arrangement, when the selector means 30 is set to close the master switch in circuit A, operation of the timer means 38$a$ will close the switch 32$a$ after a predetermined elapsed period of time, and primer 22 will be fired. When the selector 30 is set to close the master switch in circuit B, the timer means 38$b$ will close switch 32$b$ after a predetermined elapsed period of time, but only upon subsequent movement of the pendulous mercury switch 40 will the primer 24 be fired.

When selector 30 is set to close both circuits, the timer means 38$b$ in circuit B will be adjusted to initially close switch 32$b$ after a predetermined time delay, and timer 38$a$ adjusted to close switch 32$a$ after a greater predetermined time delay than that set for timer 38$b$. As switch 40 is normally open primer 24 will not fire, but should movement occur before the closing of switch 32$a$, primer 24 will be fired. If movement does not occur, primer 22 will fire upon the closing of switch 32$a$.

Included in circuit B is a rheostat 44 which is shunted across the battery 42$b$, and adjustable to dissipate its energy, and reduce its output sufficiently to prevent the firing of primer 24, and disarm the device, should movement of switch 40 not occur while there is sufficient power. This safety means is used primarily when only circuit B has been selected.

In order to prevent tampering with the receptacle 11, each circuit includes a shunt 46 across the time-actuated switches 32, the shunt including a normally open switch 48 which upon closing completes the circuit to fire the primers. The switch 48 is positioned to be operated upon removal of the receptacle top closure 16, as hereinafter described. Additionally, there is associated with circuit A a shunt 50, including a normally open switch 52 which is closed upon movement of the closure interlock as subsequently disclosed.

Figure 5:
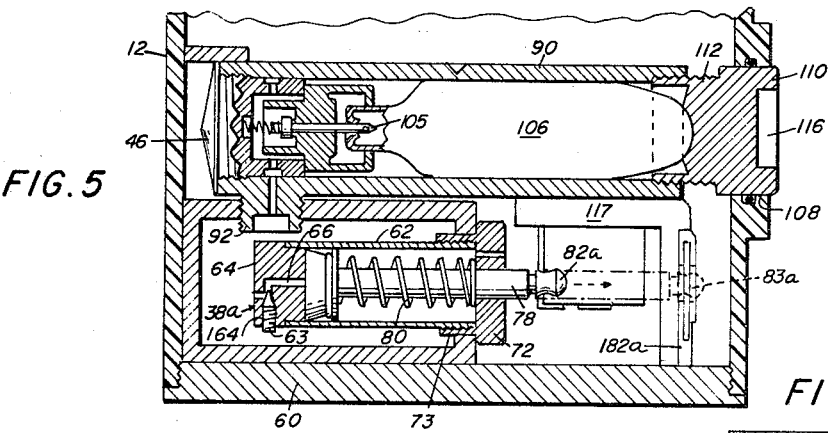
FIGURE 5 is a cross-sectional side elevation taken on the line 5—5 of FIGURE 4 and omitting the top closure and the selector.
Figure 4:
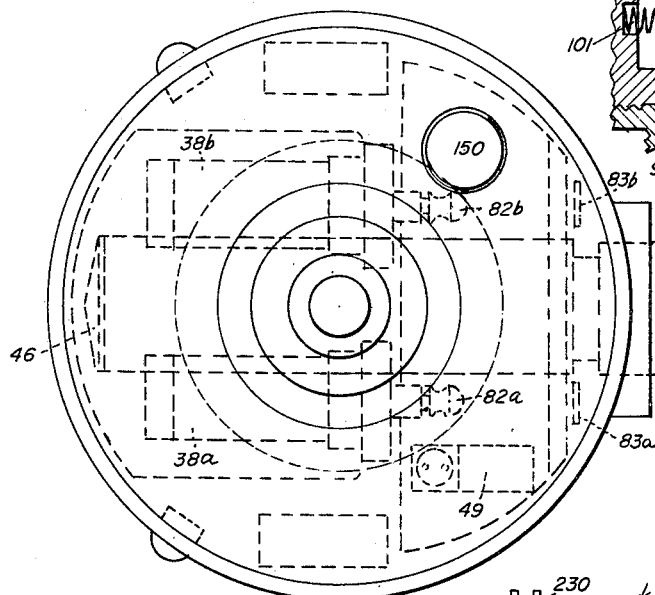
FIGURE 4 is a plan view primarily to show the interior arrangement of parts.

Referring to the other figures, the entire system is contained within the receptacle 11, except for the primers, which may or may not be. As seen in FIGURES 4 and 5, the complete timer means includes a plenum chamber 60 in which the timer pistons 38 are mounted. The plenum chamber 60 is substantially rectangular, and positioned with its front wall parallel to the receptacles transverse center line and the chamber is equally disposed to each side of the longitudinal center line. The bottom of the plenum chamber rests on the bottom 14 of receptacle 11. The timer pistons 38 are removably positioned with the plenum chamber 60, one to each side of the longitudinal center line.

Each means 38 (see FIGURES 5 and 7) comprises a cylinder 62 closed at its inner end by a plug 64. The plug 64 has screw threadably mounted in a radial bore 164, a calibrated micrometer adjusting screw 63 having an inner tapered end to function as a control valve 65, the valve 65 cooperating with a correspondingly tapered seat in the bore 164. When closed, the valve shuts off the offset passage 66 from the plenum chamber 60 to the interior of the cylinder 62. By proper presetting of the valve 65, the rate of flow of fluid from the plenum chamber to the cylinder is established and the pressure in the cylinder predetermined.

The opposite end of cylinder 62 is closed by a cap 72 having a rearwardly extending interiorly and exteriorly threaded collar 73 to screw threadably secure the cap on the threaded end of cylinder 62, thus removably mounting the means 38 within the chamber 60 through a threaded opening in the plenum chamber front wall. Thus mounted, the piston timing means may be removed to adjust valve 65. Movable within the chamber 62 is a piston 76 having a piston rod 78 extending therefrom and through an opening in cap 72. The piston is normally held in retracted position by a spiral spring 80 which may be changed to offer greater or lesser resistance as desired and thus further control the pressure required to move the piston. The forward end of the piston rod carries a capsule contact 82, insulated from the rod, and which is the movable contact for the associated switch 32 and which engages the spring lock ring half contacts 83.

Figure 5A:
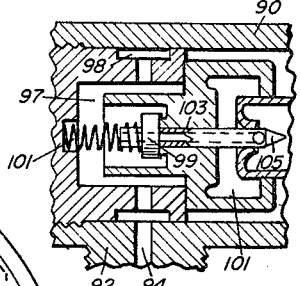
FIGURE 5a is an enlarged detail of the gas valving mechanism of FIGURE 5.

The gas or other fluid for operating the piston 76 is fed from a fluid chamber 90 positioned above and on the longitudinal center line of the plenum chamber 60. Chamber 90 has a radially depending throat 92 screw threadedly secured in an opening in the top wall of the plenum chamber, the throat 92 having a fluid passage 94 therethrough interconnecting both chambers. The inner end of fluid chamber 90 is closed by a plug 96 (FIGURES 5 and 5a) having a circumferential groove 98 defining a fluid passage connecting to the throat fluid passage 94. The forward end of recess 97 is closed by a body member 102 having a rearwardly extending sleeve portion receivable in recess 97 but of lesser depth, and outside diameter than the recess. The recess 97 and body sleeve constitutes a valve chamber for a slide valve 99 normally urged forward against the rear face of body member 102 by a spring 101 to close off a longitudinal passage 103 leading to the recess 97 from a forwardly facing recess 104 in the body member 102.

The forward end of member 102 has an opening to receive the reduced throat of a pressure source, herein shown as gas containing cartridge 106, the throat being engaged by an O ring (not shown). The cartridge 106 is of well known construction, such as those commonly used for butane cigarette lighters. When inserted, the diaphragm at the throat of the cartridge is pierced by the sharpened end of a tube 105 concentric with, supported by and extending forwardly from the passage 103. The end of tube 104 projecting within the cartridge has openings to permit the gas flow therefrom.

The end of the fluid chamber 90 is aligned with an opening 108 in the wall of the receptacle 11, and both openings are closed by a plug closure 110 having an inwardly extending sleeve 112 screw threadedly received in chamber 90. The base of the plug 110, within the sleeve 112, is contoured to engage the end of flask 106 and force the cartridge home against the piercing tube 103. An O ring 114 is provided between the plug 110 and receptacle wall, and the outer face of plug 110 has a channel slot 116 therein for receiving the end of a screw driver. When cartridge 106 is inserted and forced home, the air or gas will open valve 99 against the resistance of spring 101, whereby the gas will flow and fill the plenum chamber 60. Gas will then pass through the inlet passage 66, its rate of flow being controlled by valve 64, and the pressure build up will urge piston 76 forward until contact 82 engages and is gripped by the standard split locking ring contacts 83 (FIGURES 3 and 5) of switch 32.

Again referring to FIGURE 7, contact 83a of circuit A is in series with the selector 30 through lead 110, on one side and with lead 111, battery 42a and primer 22 on the other. In circuit B, contact 83b is in series with selector 30 through lead 112, the battery 42b, and primer 24 on one side, and lead 113 including the movement responsive switch 40 on the other.

Figure 8:
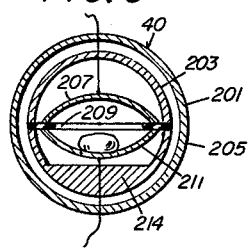
FIGURE 8 is a detailed view of the movement responsive pendulous operated mercury control switch used herein.

The switch 40, as best seen in FIGURE 8, comprises an outer housing 201 of any desirable shape, here shown as spherical. Within and floating in the outer housing is an inner chamber 203, also spherical in shape and between the two is a dampening bath of liquid such as a low viscosity oil. Within the chamber 203 is an envelope 205, comprising a pair of opposed dish-shaped metallic members 207, having their peripheries secured to the opposite faces of an insulating ring 209, the outer periphery of the ring 209 being secured to the inner surface of chamber 203. Contained within envelope 205 is a globule of mercury 211, and extending from the envelope at points on opposite sides of the ring 209 are electric leads which pass through both the inner chamber and outer housing to the exterior of the switch, suitable seals being provided to maintain the housing liquid tight, and the leads between the housing and inner chamber being sufficiently long to permit movement of the inner chamber. The switch 40 is secured to the under surface of plate 117 in the receptacle 10.

In order to maintain or return the mercury globule 211 to the position shown in FIGURE 8, i.e. in one set plane, the lower portion of the inner chamber 203 is weighted, as by increasing the wall thickness at 214 whereby a line through the center of the weighted portion will always be normal to the plane of the ring 209 and the chamber 203 will thus assume a position with ring 209 in a horizontal plane regardless of the position of the assembly in which it is carried. Because of the dampening effect of the oil bath, initial movement of switch 40 will cause chamber 203 to move with it whereupon the mercury globule will run to an end and complete the circuit before the inner chamber can return to its normal position. If this occurs when switch 32 of circuit B is closed, the primer will fire. If operation of the timer in circuit B has not started or has just started, handling of the receptacle is safe as chamber 203 will return to normal position before the time period for the closing of switch 34 has elapsed. Likewise any movement prior to the closing of switch 32b is safe, and the device may be thrown, and regardless of the position in which it lands, switch 40 will return to open or off position.

Figure 3:
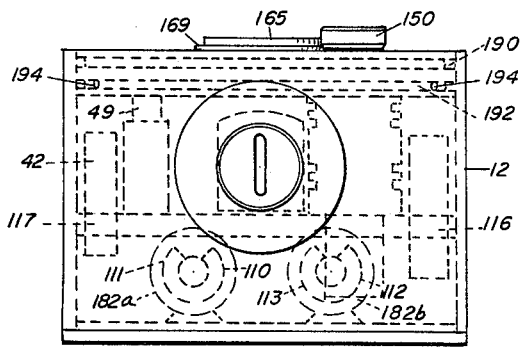
FIGURE 3 is a view similar to FIGURE 1, rotated forty-five degrees clockwise from FIGURE 1, shown with a transparent receptacle and considered a front view.
Figure 6A:
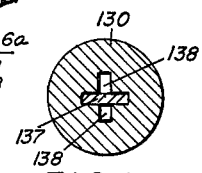
FIGURE 6a is a detail on line 6a—6a of FIGURE 6.

To assure proper closing of switches 32 there is positioned forwardly of the time responsive means 38 (see FIGURES 3 and 5) a vertically arranged plate member 116 of non-conducting material having transversely spaced cylindrical openings 182a and 182b aligned with the capsule contacts. As best seen in FIGURE 3, the electric leads of the respective circuits are embedded in the plate member and terminate in the spring locking ring halves of 83 of switch 82.

Referring now to the selector 30, it includes a tubular housing 130 (FIGURES 6 and 7) of non-conducting material having four vertically spaced horizontal exterior grooves 131, 132, 133 and 134. Leads 110 and 111 of circuit A encircle the housing respectively in the grooves 131 and 132 and have leads extending through the wall to the inner surface of the housing at the II and IV quadrants. Leads 112 and 113 of circuit B encircle the housing respectively in the grooves 133 and 134 and have leads extending through the wall to the inner surface of the housing at quadrants I and IV.

Positioned within the housing is the rotary selector 136, also of non-conducting material. The selector surface has a pair of vertically spaced contacts 138 and 140 at one quadrant and vertical grooves 142 at each of the other quadrants. As seen in FIGURE 7, when the rotor 136 is positioned with the contacts 138, 140 at quadrant IV, selector 30 closes circuits A and B. When in quadrant I, only circuit B will be closed, when in quadrant II only circuit A will be closed, and when in quadrant III, both circuits are open.

To assure proper positioning of selector 136 in its housing 130, the lower end of the selector has a tongue 137 thereon (see FIGURE 6) receivable in one of the slots of a cruciform 138 provided in a horizontal partition 140 on which the lower end of the rotor 136 seats. The housing 130 extends below the partition and carried therein is a plate 142 normally urged upwardly by a spiral spring 144 (see drawing), retained in the housing by a closure 146, and thus the selector is normally being urged upwardly in the housing. The lower portion of housing 130 is of reduced outer diameter for mounting it through an opening in a horizontal arm plate 117 which extends rearwardly from plate 116 (FIGURE 4) the plate being secured in any suitable manner to the bottom of gas chamber 90.

Figure 2:
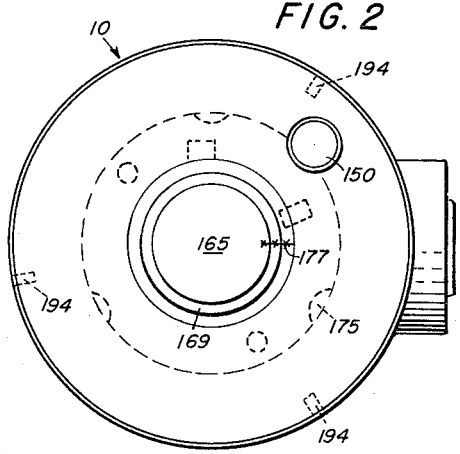
FIGURE 2 is a plan view of FIGURE 1.

The rotor 136 is restrained and locked in the receptacle by co-operating means carried by it and the cover means 16. Referring to FIGURE 6, the selector extends through an opening 161 in the cover 16 except for a top knob 150. The section of the selector which fits within the cover thickness has three vertically spaced circumferential locking grooves 152, 154 and 156 to receive locking means carried by the cover. The cover locking means comprises a pivoted bottom plate 163 having a central knob 165, an intermediate flange plate 167 carried by collar 169 which telescopes and rotates on knob 165, and a top plate 171 carried by collar 173 which telescopes and rotates on collar 169. Each of the plates is provided with a notch 175 (dotted in FIGURE 2) which, when the plates are aligned as shown by the markings 177 (FIGURE 2), are aligned with cover opening 161 and permit the insertion of the rotor 136, and when the flange plates are rotated their outer edges enter the locking grooves 152, 154, 156 and lock it into position.

The locking means also constitutes an interlock for cover 16. The periphery of the cover has a pair of circumferential grooves 190 and 192 therein, for receiving radial pins 194 projecting from the inner surface of receptacle wall 12. Assuming the pins 194 to be in sets diametrically opposite one another, the cover is also provided with vertical grooves to permit it to be lowered into position past the pins. When lowered into position, the cover opening 161 is offset from the selector housing and must be rotated into alignment whereupon pins 194 are within the grooves 192, 194. Thereafter the locking of the selector also locks cover 16 in position.

Figures 9, 9A:
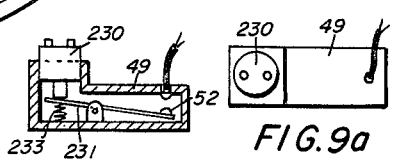
FIGURE 9 is a detail view of one of the anti-tampering switch means.
FIGURE 9a is a plan view of FIGURE 9.

To make the assembly tamper proof as possible, the shunt switches are in a housing 49 positioned on the top of arm plate 117 (see FIGURE 3) and have a cylindrical head 230 (FIGURES 9 and 9a) carrying the four leads from the shunts to contacts on the upper surface thereof. Head 230 is carried on one end of a pivoted arm 231 which is normally urged upwardly by a spring 233. The head 230 also operates the switch 52 in shunt 50 of circuit A. This switch is closed when the cover is off, but is opened when the cover forces down head 230. Thus if the cover is removed by an unauthorized person, switch 52 will close and primer 22 will be fired.

The contact carrying head 230 is normally in raised position and thus the switches are closed when cover 16 is off. However, when cover 16 is in closed position, head 230 is pivoted downwardly opening the switch (FIGURE 9) one lead of the shunt being connected to a contact 235 on arm 231 and the other to a contact 237 carried on the inside of the switch housing. If desired, a similar shunt and switch 52 may be associated with the receptacle closure 110 for the gas chamber 90.

If it be desired that the device detonate by movement alone, a normally closed switch 250 may be used across the normally open switch 32b of circuit B (FIGURE 7). Thus, with the selector switch closed for circuit B, the circuit is interrupted only by switch 40, and movement of the receptacle will cause the mercury globule to make contact to close the circuit and cause detonation. Switch 250 is an ordinary spring arm actuated switch and positioned so that the forward end of capsule contact 82b may engage and open it, the spring arm being insulated on the engaging side. When this occurs, the device will detonate upon movement, and if circuit A is also operational, it will detonate after a predetermined time in the absence of movement. When switch 250 is included, a pull-out bayonet member 251 of insulating material is used, the member keeping switch 250 open until the device is properly placed.

Although the invention has been shown in conjunction with a land mine, it is obvious that other uses could be made of it, as for other types of armament, for sequentially exploding remote dynamite charges or for less hazardous uses. For example, in FIGURE 7 the primers 22 and 24 are shown as flashlight bulbs, which could be used for successive picture taking at predetermined time periods. Obviously, many uses, such as the last, would not require the inclusion of the anti-tampering means or the movement switch.

The assembly having been described, the following is claimed:

1. A compact portable control assembly including a receptacle, an electrical circuit therein having in series, a power source, leads to a device to be actuated, a switch having a fixed contact closed by a movable contact, the movable contact being operated by mechanical fluid responsive pressure means, and valving means in said last means for adjusting the flow of the fluid to control the movement of the movable contact, wherein said fluid operating means includes a plenum chamber for fluid under pressure, a cylinder removable mounted in the plenum chamber, a piston in the cylinder having a piston rod extending therefrom exterior of the plenum chamber, said movable contact being operated by the extending end of the piston rod, and said valving means being carried by the inner end of the cylinder and removable therewith.

2. The assembly defined in claim 1 including a first fluid chamber for a source of fluid under pressure, a connection between the gas chamber and plenum chamber having flow passages therethrough, and valve means in said flow passage responsive to pressure in the chambers to control the gas flow from the fluid chamber to the plenum chamber.

3. The assembly defined in claim 2 wherein the first fluid chamber is open at one end to receive a diaphragm closed cartridge of fluid under pressure, the receptacle having an opening in the wall thereof alignable with the open end of the first fluid chamber, a piercing device at the other end of the fluid chamber aligned with the flow passage connection to the plenum chamber, and a plug closure for simultaneously closing the receptacle opening, the fluid chamber open end, and forcing the cartridge diaphragm against the piercing device.

4. A compact portable control assembly including a receptacle, an electrical circuit therein having in series, a power source, leads to a device to be actuated, a switch having a fixed contact closed by a movable contact, the movable contact being operated by mechanical fluid responsive pressure means, and valving means in said last means for adjusting the flow of the fluid to control the movement of the movable contact including a movement switch in the series circuit movable to closed position upon movement of the receptacle, and means associated with the switch for returning it to open position upon the receptacle coming to rest.

5. A compact portable control assembly including a receptacle, an electrical circuit therein having in series, a power source, leads to a device to be actuated, a switch having a fixed contact closed by a movable contact, the movable contact being operated by mechanical fluid responsive pressure means, and valving means in said last means for adjusting the flow of the fluid to control the movement of the movable contact including a master switch having a fixed contact and a movable contact, and rotor means extending exterior of the receptacle for moving the movable contact.

6. The assembly defined in claim 5 including a removable cover on the receptacle, cooperating pin and groove means on the receptacle and cover for holding the cover in closed position, the cover having an opening through which said rotor means extends and is removable and cooperating means on the cover and rotor interlocking the cover and rotor in position on and in the receptacle.

7. The assembly defined in claim 5 including a shunt around the time delay switch, a normally open switch in the shunt, and means on the interior of the cover for closing the switch upon movement thereof.

8. A control assembly including a receptacle, a first and second circuit therein, each circuit including in series a power source, leads to a device to be actuated, a delay switch and pressure means for operating the switch, a master switch, and a normally open switch; and selector means extending exterior of the receptacle and movable to a plurality of positions for selectively closing the first circuit, the second circuit or both circuits simultaneously.

9. The assembly defined in claim 8 wherein said selector includes a rotor removable from the receptacle, and cooperating means on the rotor and interior of the receptacle for holding the rotor in its selected position within the receptacle.

10. A switch responsive to movement including an outer casing, a chamber suspended in the outer casing, means normally holding the inner chamber in a set position, means between the chamber and casing temporarily restraining moving the inner chamber out of set position upon movement of the casing, and switch means within the inner chamber which are open when the chamber is in set position and closed upon movement therefrom, wherein the suspending and restraining means for the chamber is a low viscosity fluid, the chamber having a weighted portion normally holding it in a set position, a globule of mercury within the chamber movable upon movement of the chamber, and a pair of contacts within the inner chamber, at least one being out of contact with the mercury when the chamber is in set position, wherein the switch contacts comprise a pair of dish shaped metal members, an insulating ring having opposed surfaces to which the peripheries of the metal members are respectively secured on the opposite surfaces thereof, said ring having its outer periphery secured to the inner chamber wall in a plane normal to the weight portion of the chamber, and said mercury globule being positioned in the lower dish shaped member when the chamber is in set position.

11. A control device comprising a first chamber for a source of gas under pressure, a cylinder, a piston movable in the cylinder, means interconnecting the fluid chamber and cylinder having a flow passage therein, and valving means in the connection and adjustable to a predetermined position to vary the size of the flow passage, and means actuated by movement of the piston.

12. The control device defined in claim 11 including a plenum chamber between the first chamber and the cylinder, a connection between the first chamber and plenum chamber having a flow passage therethrough, and a spring actuated valve normally closing off the passage.

13. The control device defined in claim 12 wherein the cylinder has a forward closure and a rear closure, said forward closure removably mounting the cylinder through an opening in the plenum chamber with the cylinder disposed in the plenum chamber, said rear closure is a connecting means between the plenum chamber and cylinder and has a flow passage therein, and said means actuated by the piston constitutes a piston rod extending throughout the length of the cylinder and through an opening in the forward closure.

14. A compact portable assembly including a receptacle, said receptacle having enclosed therein, an electrical circuit, having in series, a power source, a switch having an open fixed contact, means for closing the open fixed contact, including a movable contact, mechanical pressure responsive means for moving said movable contact to close said fixed contact, valving means in said pressure responsive means for adjusting the flow of the fluid to control the movement of the movable contact, and leads from the electrical circuit extending exterior of the receptacle for connecting it to a device to be actuated.

15. A switch responsive to movement including a fixed outer casing, a chamber within and separate from the casing, fluid means in the casing on which the chamber freely floats, switch means in the chamber, said switch means being open when the inner chamber positions the switch means in a set position in respect to a horizontal plane and closed upon movement therefrom, and means on the inner chamber normally holding the chamber to position the switch means in a set position in respect to the horizontal plane and returning the chamber to that position upon any movement therefrom.

16. The switch as defined in claim 15, wherein the switch means includes a conducting movable globule within an envelope arranged transversely of the inner chamber, and the means on the inner chamber for holding and returning it to set position is a weight positioned on the inner chamber beneath the switch means.

References Cited

UNITED STATES PATENTS 2,239,587  4/1941  Bertram _____ 200—82

FOREIGN PATENTS 624,112  8/1961  Italy.

LEE T. HIX, Primary Examiner

D. J. HARNISH, Assistant Examiner

U.S. Cl. X.R.

102—70.2; 200—61.47, 82